US010949791B2

(12) United States Patent
Mohanty et al.

(10) Patent No.: US 10,949,791 B2
(45) Date of Patent: Mar. 16, 2021

(54) COLLABORATIVE PLATFORM FOR IT SERVICE AND VENDOR MANAGEMENT

(75) Inventors: Santosh Kumar Mohanty, Mumbai (IN); Abhijit Kumar Mazumder, Mumbai (IN); Vijayalakshmi Gopal, Chennai (IN); Shouvik Banerjee, Mumbai (IN); Dillip Kumar Majhi, Bhubaneswar (IN); Manas Shome, Bhubaneswar (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 13/404,021

(22) Filed: Feb. 24, 2012

(65) Prior Publication Data

US 2013/0117195 A1    May 9, 2013

(30) Foreign Application Priority Data

Mar. 7, 2011    (IN) .......................... 632/MUM/2011

(51) Int. Cl.
*G06Q 10/06* (2012.01)
*G06Q 10/10* (2012.01)

(52) U.S. Cl.
CPC ........... *G06Q 10/067* (2013.01); *G06Q 10/06* (2013.01); *G06Q 10/103* (2013.01)

(58) Field of Classification Search
CPC ....... G06Q 10/06; G06Q 10/10; G06Q 10/103
USPC .......................................................... 705/348
See application file for complete search history.

(56) References Cited

U.S. PATENT DOCUMENTS

| 7,966,370 | B1* | 6/2011 | Pegg et al. ................... 709/204 |
| 2004/0153359 | A1* | 8/2004 | Ho ......................... G06Q 10/06 705/7.25 |
| 2007/0033088 | A1* | 2/2007 | Aigner et al. .................... 705/9 |
| 2008/0091454 | A1* | 4/2008 | Fisher, Jr. ........................ 705/1 |
| 2009/0063559 | A1* | 3/2009 | Rhodes ............. G06F 17/30569 |
| 2009/0172183 | A1* | 7/2009 | Derksen .................. H04L 12/24 709/232 |
| 2010/0262521 | A1* | 10/2010 | Robinson ............... G06Q 10/08 705/29 |
| 2014/0181255 | A1* | 6/2014 | Thomas ................ G06F 9/5072 709/217 |

OTHER PUBLICATIONS

"Enlighta Govern for Multi-Vendor Governance," http://www.enlighta.com (published at least as early as May 1, 2012).
"EquaSiis Enterprise," http://www.equaterra.com/Services/Governance-Tools-EquaSiis-Enterprise8-47.html (published at least as early as May 1, 2012).

(Continued)

*Primary Examiner* — Maria C Santos-Diaz
(74) *Attorney, Agent, or Firm* — Thompson Hine LLP

(57) ABSTRACT

The present invention provides a system and method for providing enterprise level platform that enables collaborative business service delivery and governance through access to underlying infrastructure for connected customer-vendor systems. The said enterprise platform that seamlessly brings together various point solutions with intent of providing a single window that enables access to the underlying infrastructure for a connected customer-vendor IT operations.

6 Claims, 12 Drawing Sheets

(56) References Cited

OTHER PUBLICATIONS

"IT Financial Management Technology Platform," http://www.digitalfuel.com/products/technology (published at least as early as May 1, 2012).

ITIL® Glossary and Abbreviations—English, Axelos Limited, 2011.

"SQL Server Integration Services," website of Microsoft, http://technet.microsoft.com/en-us/library/ms141026.aspx (at least as early as Jul. 2014).

Camunda BPM User Guide, web page of Camunda Services GmbH, pp. 1-10 (2013) entire document available at http://docs.camunda.org/latest/guides/user-guide/.

IPV Process Engine, web page of IPV Limited, http://www.ipv.com/products/process-engine/ (at least as early as Apr. 6, 2013).

IBM Content Foundation—Process Engine Web Service, web page of IBM Corporation, http://pic.dhe.ibm.com/inforcenter/conf/v5r2m0/index.jsp?topic=%2Fcom.ibm.p8.pe.dev.doc%2Fweb_services%2Fws_overview.htm(at least as early as Oct. 2013).

Website home page of ITIL®, http://www.itil-officialsite.com/ (at least as early as Jul. 2014).

Understanding Role Management, web page of Microsoft, http://msdn.microsoft.com/en-us/library/vstudio/5k850zwb(v=vs. 100).aspx (2014).

Enterprise content management planning (SharePoint Server 2010), web page of Microsoft, http://technet.microsoft.com/en-us/library/ff602190(d=printer.v=office.14).aspx ( at least as early as 2014).

Shaping Network Society, Reflecting the Rise of the Ideation Platform, web page of Philipp Mueller, http://www.philippmueller.de/e-participation-2-0-reflecting-the-rise-of-the-ideation-platform/ (at least as early as Jul. 2009).

Hentrich, Carsten and Zdun, Uwe, "Patterns for Process-Oriented Integration in Service-Oriented Architectures," in Proceedings of 11th European Conference on Pattern Languages of Programs (EuroPLoP), 2006.

Brandt, Donald R., Architectures Exam Cram, The Coriolis Group, 1999, pp. 41-54, 107-139, 145-173, 181-192, 209-229, and 245-256.

Chang, James F., Business Process Management Systems: Strategy and Implementation, ed. 2006, Auerbach Publications, p. 192, http://books.google.co.in/books?id=LBtC3-rmlalC&pg=PA192&dq=process+engine+and+integration+services&source=bl&ots=SldKhpfvZ3&sig=zKTXojMQvg6NARboTDhfdYJrJMI&hl=en&sa=X&ei=ri29U6-ElpeF8gXvwlGYAg&ved=0CCoQ6AEwBA#v=onepage&q=process%20engine%20and%20integration%20services&f=false.

Sherif, Mostafa Hashem, Managing Products in Telelcommunication Services, 2006, published by John Wiley & Sons, Inc., Hoboken, NJ, Project Management (Chapters 1 and 3), Vendor Management (Chapter 9), Risk Management (Chapter 10), and Service Management (including supplier management) (Chapter 11, p. 200) http://books.google.com/books?id=IoITuQZAOMQC&pg=PA157&dq=vendor+management&hl=en&sa=X&ei=9VqxU42jE7S0sQSUq4CgCQ&ved=0CF0Q6AEwCA#v=onepage&g=vendor%20management&f=false.

Baschab, John & Piot, Jon, The Executive's Guide to Information Technology, 2007, John Wiley & sons, 2nd Ed., Chapter 13: Vendor Management, Chapter 16: Risk Management, Chapter 17: Demand Management http://books.google.com/books?id=YokHukRBZoAC&pg=PA455&dq=vendor+management&hl=en&sa=X&ei=9VqxU42jE7S0sQSUq4CgCQ&ved=0CE8Q6AEwBg#v=onepage&q=vendor%20management&f=false.

Bossert, James L., The Supplier Management Handbook, 2004, ASQ Quality Press http://books.google.com/books?id=1H_SELK-K_IC&printsec=frontcover&dq=Supplier+management&hl=en&sa=X&ei=r2GxU_CjJZG-sQTvwlJO&ved=0CC8Q64EwAA#v=onepage&q=Supplier%20management&f=false.

Kouns, Jake & Minoli, Daniel, Information Technology Risk Management in Enterprise Environment: A Review of Industry Practices & A Practical Guide to Risk Management Teams, 2011, John Wiley & Sons, Chapter 3 http://books.google.com/books?id=0D2eM4GQCcqC&pg=PT71&dq=incident+management+information+technology&hl=en&sa=X&ei=oGOxU4mhAu_JsQS_wYlw&ved=0CEEQ6AEwAw#v=onepage&q=incident%20management%20information%20technology&f=false.

Borghoff, Uwe M. & Pareschi, Remo, Information Technology for Knowledge Management, 1996, Springer http://books.google.com/books?id=mOWvmnLzvwC&printsec=frontcover&dq=knowledge+management+information+technology&hl=en&sa=X&ei=kGWxU_jMOKrJsQSgpYHwDw&ved=0CC8Q6AEwAA#v=onepage&q=knowledge%20management%20information%20technology&f=false.

De Jong, Arjen and Kolthof, Axel, Foundation of IT Service Management Based on ITIL® V3, 2007, Van Haren Publishing, http://books.google.com/books?id=PKNFiXLk5blC&printsec=frontcover&dq=ITIL°V3+Foundation+Handbook&hl=en&sa=X&ei=VWmxU5jVApDJsQTPIYDwBA&ved=oCC8Q6AEwAA#v=onepage&q&f=false.

ITIL® V3 Foundation Handbook, vol. 10, 2009, TSO, http://books.goole.com/books?id=Y1s0uAAACAAJ&dq=ITIL+V3+Foundation+Handbook&hl=en&sa=X&ei=VWmxU5jVApDJsQTPIYDwBA&ved=0CEoQ6AEwBA.

*Software Engineering and Human-Computer Interaction, ICSE '94 Workshop on SE-HCI: Joint Research Issues,* Sorrento, Italy, May 1994, *Platform Independent GUI Builders Advance Software Engineering to Handle HCI Issues,* p. 29, retrieved from the internet: https://books.googlecom/books?id=itgl2q0Ex2MC&pg=PA29&dq=computer+platform&hl=en&sa=X&ei=SoTaVPa_Bsa2vASY7YDqDw&ved=0CEUQ6AEwBA#v=onepage&q=computer%20platform&f=false.

* cited by examiner

Figure 8A

COLLABORATIVE PLATFORM FOR IT SERVICE AND VENDOR MANAGEMENT

FIELD OF THE INVENTION

The present invention relates to system and method for providing enterprise level platform that enables collaborative service delivery and governance through access to underlying infrastructure for connected customer-vendor systems. More particularly, this invention relates to enterprise platform that seamlessly brings together various point solutions with intent of providing a single window that enables access to the underlying infrastructure for a connected customer-vendor IT operations.

BACKGROUND OF THE INVENTION

Large IT outsourcing engagements typically involve the participation of multiple stakeholders with complementing and competing capabilities. The rationale is being stakeholder diversity helps in keeping prices competitive and managing the risk of a particular stakeholder failing. While a move like this undoubtedly yields short to mid-term benefits, it fails in its endeavor to maximize long term benefits by itself, the reason being that competing stakeholders traditionally work in silos with the intent of optimizing within their own areas without having a holistic view of the business needs. Further, overlapping features among point solutions coupled with an unregulated adoption increases IT service management complexity that invariably affects an organization's aspirations to fully extract strategic benefits.

The effect of not addressing this status quo leaves organizations in a challenging position, which may result in:
  Increased total cost of operations due to duplicity in vendor efforts;
  Reduced efficiency due to significant efforts spent on multi-vendor governance;
  Eventual vendor lock-ins and loss of control of data; and
  Increased unpredictability due to lack of visibility into vendor processes.

The above drivers lead to the design of a common enterprise platform that address the above mentioned problem of the art.

Some of the products known to us which deal in addressing the above mentioned problems are as mentioned below:

Enlighta's product "Multi-vendor governance tool" describes a platform that provides the comprehensive support for the multi-vendor governance for globally sourced (i.e. internal, captive or outsourced) services.

EquaSiis's product "EquaSiis Enterprise" describes a collaborative solution which is designed specifically for teams that govern critical business services through outsourced or shared services delivery models. It also automates the more routine transactional components of governance while providing a rich suite of analysis and decision-support tools.

Digital fuel's product "IT Financial Management Technology Platform" describes an IT Financial Management built on an integrated SaaS platform that is used daily by leading organizations worldwide, managing thousands of IT assets and services.

The above mentioned prior-arts are customer-centric in nature, wherein the customer is managing a multi-stakeholder environment. However, there exists a need to have system that not only simplifies the adoption and implementation of business service management processes but also promotes stakeholder collaboration while retaining the flexibility to adopt individual best-in-class point solutions. Such a system should also focus on the stakeholders working in the customer's environment in terms of addressing their needs for seamless collaboration and business service delivery. The collaborative capability of the system under effective governance is expected to enrich stakeholders' performance resulting in faster and better service to customers.

OBJECTS OF THE INVENTION

The main object of the present invention is to provide a system and method for providing enterprise level platform that enables collaborative service delivery and governance through access to underlying infrastructure for connected customer-vendor systems.

Another significant object of the invention is to provide an enterprise platform that seamlessly brings together various point solutions, with intent of providing a single window that enables access to the underlying infrastructure for a connected customer-vendor IT operations.

Another object of the invention is to provide a system and method for simplifying the adoption and implementation of business service management processes but also promotes stakeholder collaboration while retaining the flexibility to adopt individual best-in-class point solutions.

Another object of the invention is to provide a system and method for focusing on the stakeholders working in the customer's environment in terms of addressing their needs for seamless collaboration and business service delivery.

Yet another object of the invention is to provide a system and method for focusing on multi-vendor/stakeholder governance as well as collaboration (customer as well as vendor/other stakeholder centric) in a multi-stakeholder environment.

Still another objective of the invention is to provide an enterprise level platform to contribute and share reusable processes and components across the environment.

Yet another object of the invention is to provide an integrated enterprise level platform that pulls up governance data from multiple sources and facilitates cross-stakeholder governance through the single integrated enterprise level platform.

SUMMARY OF THE INVENTION

Before the present systems and methods, enablement are described, it is to be understood that this invention is not limited to the particular systems, and methodologies described, as there can be multiple possible embodiments of the present invention and which are not expressly illustrated in the present disclosures. It is also to be understood that the terminology used in the description is for the purpose of describing the particular versions or embodiments only, and is not intended to limit the scope of the present invention which will be limited only by the appended claims.

The present invention provides a system and method for providing an enterprise level collaborative information management platform that enables management of business services and governance through IT for a customer along with its interfacing vendors.

In one aspect of the invention, an enterprise platform that seamlessly brings together various point solutions for business services management and governance with intent of providing a single window that enables access to the underlying infrastructure for a connected customer-vendor IT operations.

In another aspect of the invention, a system and method for simplifying the adoption and implementation of business service management processes but also promotes stakeholder collaboration while retaining the flexibility to adopt individual best-in-class point solutions.

In another aspect of the invention, a system and method that focuses on the stakeholders working in the customer's environment in terms of addressing their needs for seamless collaboration and business service delivery.

In another aspect of the invention, a system and method that provides a common architecture for sharing of data across business service management and business governance modules subject to access privilege conditions.

Yet another aspect of the invention, a system and method that focuses on multi-vendor/stakeholder governance as well as collaboration (customer as well as vendor/other stakeholder centric) in a multi-stakeholder environment.

BRIEF DESCRIPTION OF THE DRAWINGS

The foregoing summary, as well as the following detailed description of preferred embodiments, are better understood when read in conjunction with the appended drawings. For the purpose of illustrating the invention, it is shown in the drawings exemplary constructions of the invention; however, the invention is not limited to the specific methods and system disclosed. In the drawings:

Figure 8A:
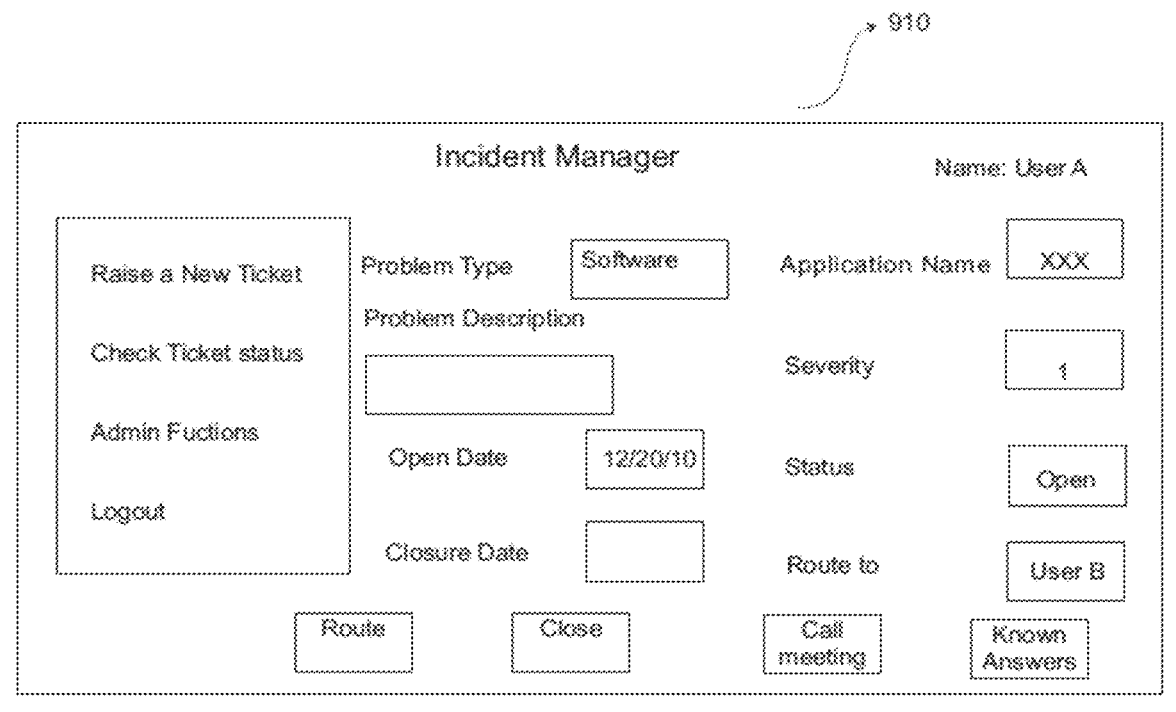

FIG. 8A shows an incident manager of the enterprise level platform enables to raise incident ticket by User A according to one exemplary embodiment of the invention.

DETAILED DESCRIPTION OF THE INVENTION

Some embodiments of this invention, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise. Although any systems and methods similar or equivalent to those described herein can be used in the practice or testing of embodiments of the present invention, the preferred, systems and methods are now described. The invention will now be described with reference to the accompanying drawing which does not limit the scope and ambit of the invention.

Figure 1:
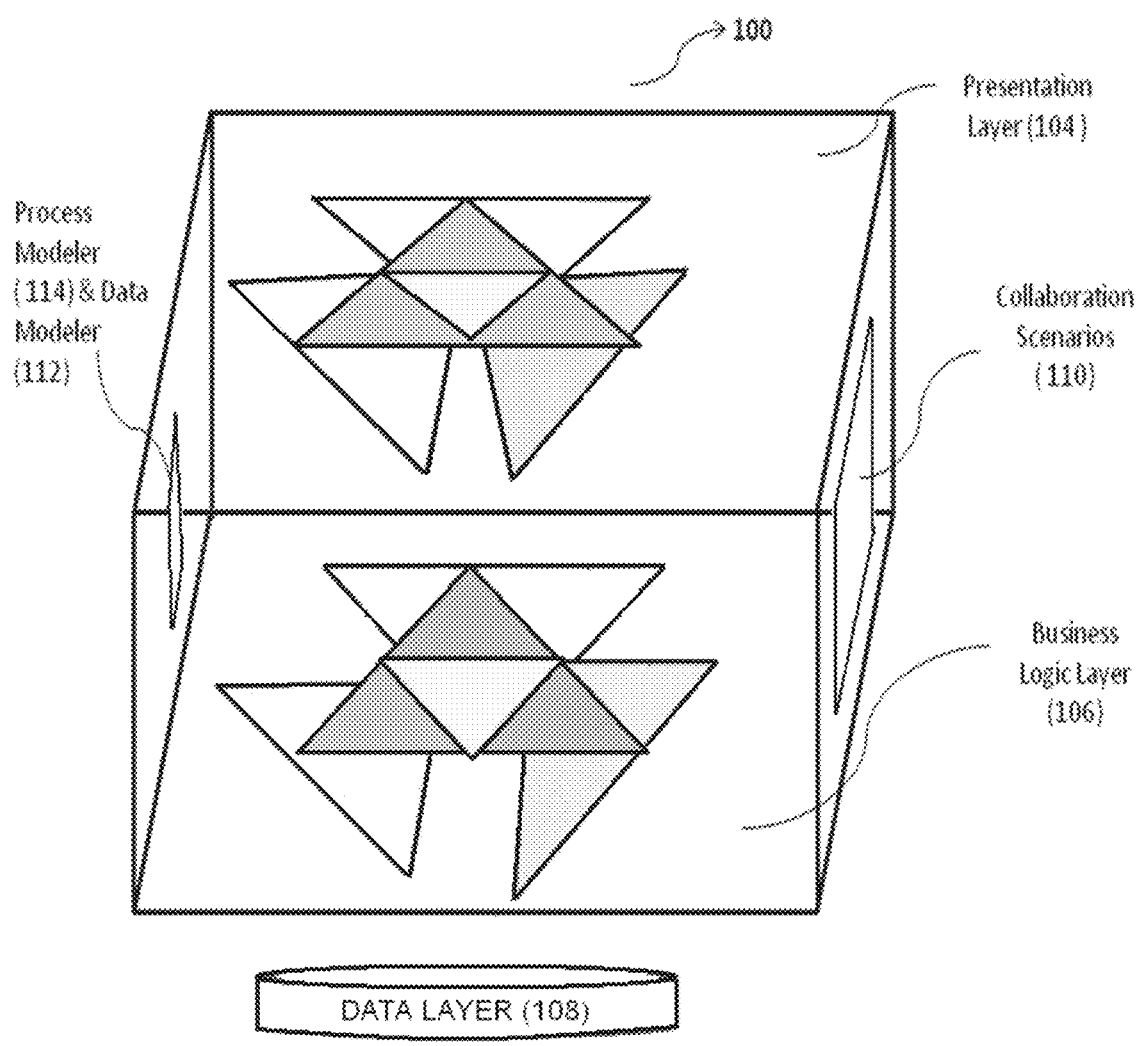
FIG. 1 shows system architecture for providing collaborative platform which enables access to the underlying infrastructure for connected customer and vendor systems according to multiple embodiments of the invention.

The present invention addresses the following pain areas for large Information Technology (IT) outsourcing organizations engaging multiple vendors and stakeholders:

a) Dependency on vendors/stakeholders due to fragmented enterprise knowledge that such vendors/stakeholders retain in their own silos; this also includes loss of control of both data and knowledge for the organization, accordingly the present invention provides an integrated single platform, wherein all such knowledge and data can be shared and retained with the organization, thereby reducing the risk of vendor lock-ins b) Drag on the operational efficiency, hence strain on both time and cost for the organization, across the multi-vendor/stakeholder environment due to:

Fragmented service delivery without any seamless collaboration and workflow management among the vendors/stakeholders, accordingly the present invention provides a platform that integrates collaboration aspect with IT service delivery management;

Duplicity in effort (hence cost for organization) due to non-reusability of processes and components across different engagements, accordingly the present invention provides a platform to contribute and share reusable processes and components across the environment;

Fragmented governance across multiple vendors and stakeholders due to non-standardized governance mechanisms and systems, which sometimes are unique to the vendors, according the present invention provides an integrated platform that pulls up governance data from multiple sources and facilitates cross-stakeholder governance through a single platform c) Issues in alignment of business and IT divisions in the organization: In order to solve this problem, the present invention provides a controlled, yet transparent platform where IT can align with business and effectively enable managing budgets, time, costs, quality, etc as required by the business FIG. 1 shows system architecture for providing an enterprise wide collaboration platform which enables management of business services and governance through use of IT by connecting customers with their interfacing vendors according to multiple embodiments of the invention. Business services are defined as services which monitor and measure IT services from a business perspective including but not restricted to IT support management, vendor management, financial management, human resource management, enterprise planning, project management and innovation management and other organized domains of businesses, wherein the architectures, applications, software and hardware devices of the present invention may be implemented. Interfacing vendors represents vendors who are directly associated with the customer for one or more engagements. According to one exemplary embodiment of the invention, a system comprises at least one customer 120 (not shown in the figure) and two or more service vendors 122 (not shown in the figure) connected to a platform 100 by a communication network 124 (not shown in the figure). The customer/client/project assignor 120 and vendor/stakeholder/service contributor 122 can access the platform 100 from the computer, Laptop, PDA, or any other computational device. The said communication network 124 can be selected from the internet, intranet, and any other communication networks. In a preferred embodiment, the communication network 124 is internet.

The platform 100 comprises of a presentation layer 104, business logic layer 106, database layer 108, collaboration scenarios module 110, data modeler 112 and process modeler 114. The presentation layer 104 is the User Interface which either the customer 120 or vendor 122 interacts with. This presentation layer 104 provides access to all the point solutions for management business services, governance, information sharing across various stakeholders and collaboration. In one preferred embodiment the platform 100 provides applications for project management, IT support management and vendor management. Similarly, in alternate embodiment, the platform 100 can be connected to financial management system, wherein it provides facilities for collaboration between the client and vendors to manage finances.

In one preferred embodiment, the platform 100 provides applications for project management, IT support, and vendor management, the presentation layer 104 provides access to applications for project management (project and program management, quality and budget management, demand management, etc.), IT service management (incident and problem management, service desk and help desk operations, capacity management, etc.), and vendor management (vendor management, contract management, etc.). The access to these applications can be through disparate service portals or through a unified service portal providing access to all these three applications. The presentation layer 104 contains the logic for Personalization, Common Visualization and Integrated Reporting. The Presentation Layer 104 allows for access through multiple devices like PC, smart phone and any other communication devices.

Each of the services in the presentation layer 104 is connected to their corresponding business logic in the Business Logic Layer 106. The technology used for this connection is either Web Service or ESB Mule, depending on the type of service. The Application Suite in the Business Logic Layer 106 is organized in the same way as in the Presentation Layer 104 in the form of core services common to all 3 applications, services common to a particular Application like Project management and point services. When a user either a customer or a vendor invokes a service the corresponding business logic is invoked which involves either an interaction with the either one of database layer 108, collaboration scenarios module 110, data models 112, and process models 114. After execution of logic at either one of these modules the control is returned back to the business logic layer 106.

The collaboration scenarios 110 are invoked by the services in the Business Logic layer 106 through Web Services, RSS feeds and Alert Mechanisms. The Collaboration Scenarios module 110 contains logic for Content Management and User Role Management. The Content Management gives the various use case scenarios of how different services communicate with each other. These services may belong to one Application or can even belong to a different application. The use case scenarios can be configured at a user role level or at the organizational level. The use case scenario can be even configured at service level wherein a certain set of services communicate with each other across roles and organizations. The other module in Collaboration Scenarios 110 is User Role Management which manages the users, organizations and roles which are present in these organizations. It allows for authentication and authorization of users by maintaining the authentication parameters and mapping of users to roles. The unit also maintains the data and service access privileges of roles and tags them to organizations. This also allows for delegation of roles by users. Both modules in Collaboration Scenarios 110 are configurable by users with the required privileges.

The Data and Process Models contain modules for Data Model and Process Model. The Data Modeler module 112 is invoked by services in Business Logic layer 106 to determine the structure of data which the service wants to access or store data to the database. The Process Modeler module 114 is invoked by the services from Business logic layer 106 to determine the steps involved in that workflow and the roles involved. The Process Modeler module 114 has a Business Process Modeler to configure modify or add or delete workflow. The modification of workflow involves adding or deleting steps in a workflow, changing the decision happening at a workflow, modifying dependencies and changing the role associated etc.

The Database layer 108 is invoked by the services in Business Logic layer 106 to access or store data, changes in state after determining the data structure from Data Modeler module 112.

Figure 2:
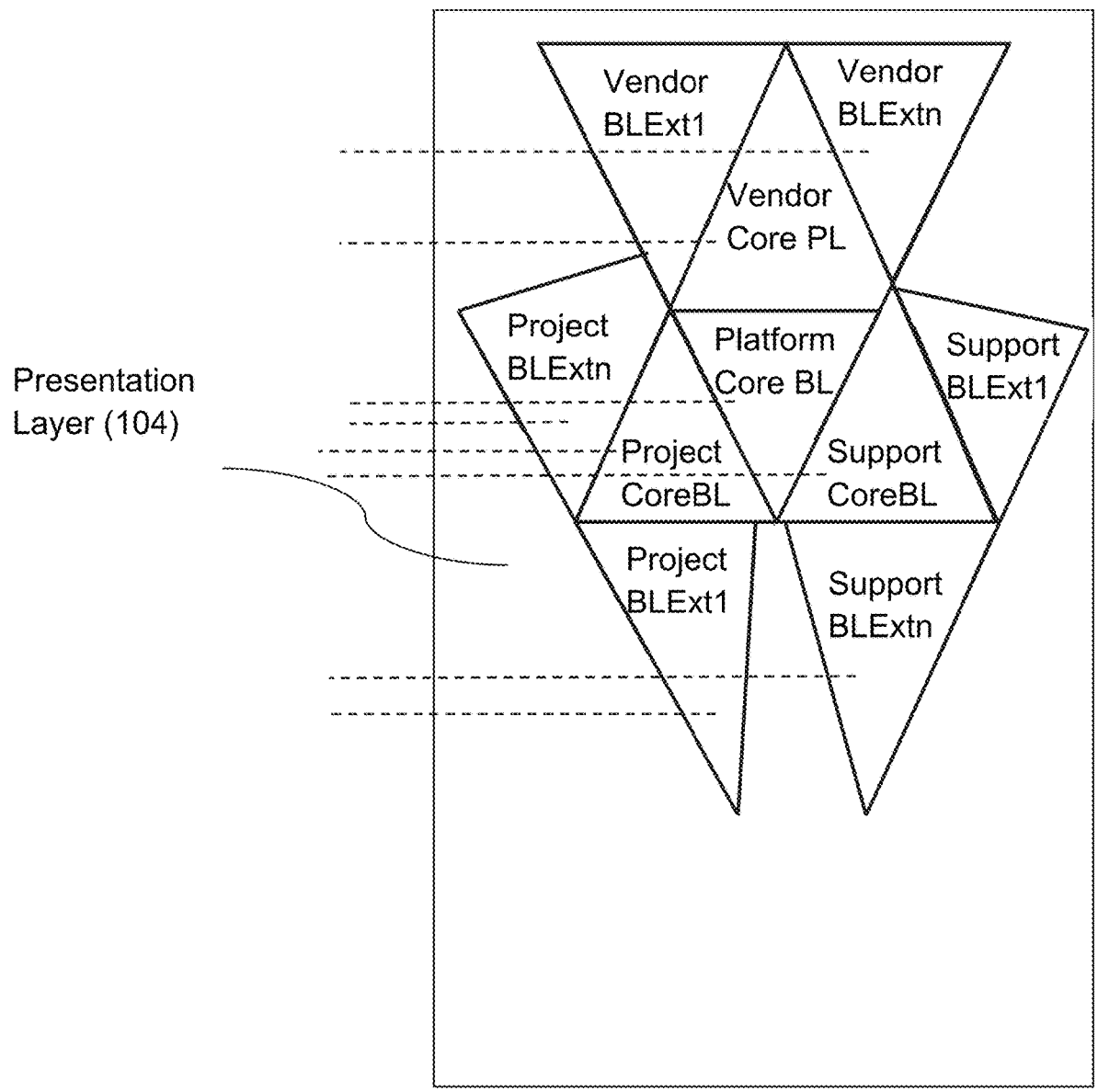
FIG. 2 shows a detailed view of a Presentation layer for an exemplary embodiment which provides applications for project management, IT support management and vendor management.

FIG. 2 shows a detailed view of a Presentation layer 104 for an exemplary embodiment which provides applications for project management, IT support management and vendor management. The access to these applications can be through disparate service portals or through a unified service portal providing access to all these three applications. The services provided at the presentation layer 104 can be segregated into core services and service extensions. The core services represent the services which are used by all other services in the application. The service extensions represent the aspects of the service which are not covered by the core.

The platform 100 offers a core set of services, which are used across all 3 applications i.e., Project Management, IT Support Management and Vendor management. These are core services comprises of User Role management System, Reporting Mechanism, Lucen Search Engine, Content Management System, Knowledge Management, Collaboration, Ideation Platform, Messaging system, Alerts, Process Engine and Integration. These core services are built with meta-meta model to provision for end users configurability support, scalability and user friendly functionality. Collaboration components include but not limited to blogs, forums & wiki, chats, Alerts include notifications comprises of emails and SMS. Then there are a set of services common to a particular application like Project Management, or IT Support Management. These include services like User Role Management, Alerts, Messaging, Process Engine and Lucen search. Then there is the third segment of services which includes application specific functional services which are derived from the third party applications connected to the platform 100.

In the FIG. 2, only two service extensions are shown, which is for the purpose of simplicity of diagram and in no way limits the number of service extensions supported by the presentation layer 100. In one preferred embodiment, the service extensions for IT project management application are Demand Management, Change Management, Risk management and Ideation & Transformation. The service extensions for IT support management are Incident & Request Management, Capacity management, Problem management, Service Desk and Catalog & Asset management. The service extensions for IT vendor management are Supplier Management, Contract management and Sourcing management.

Figure 3:
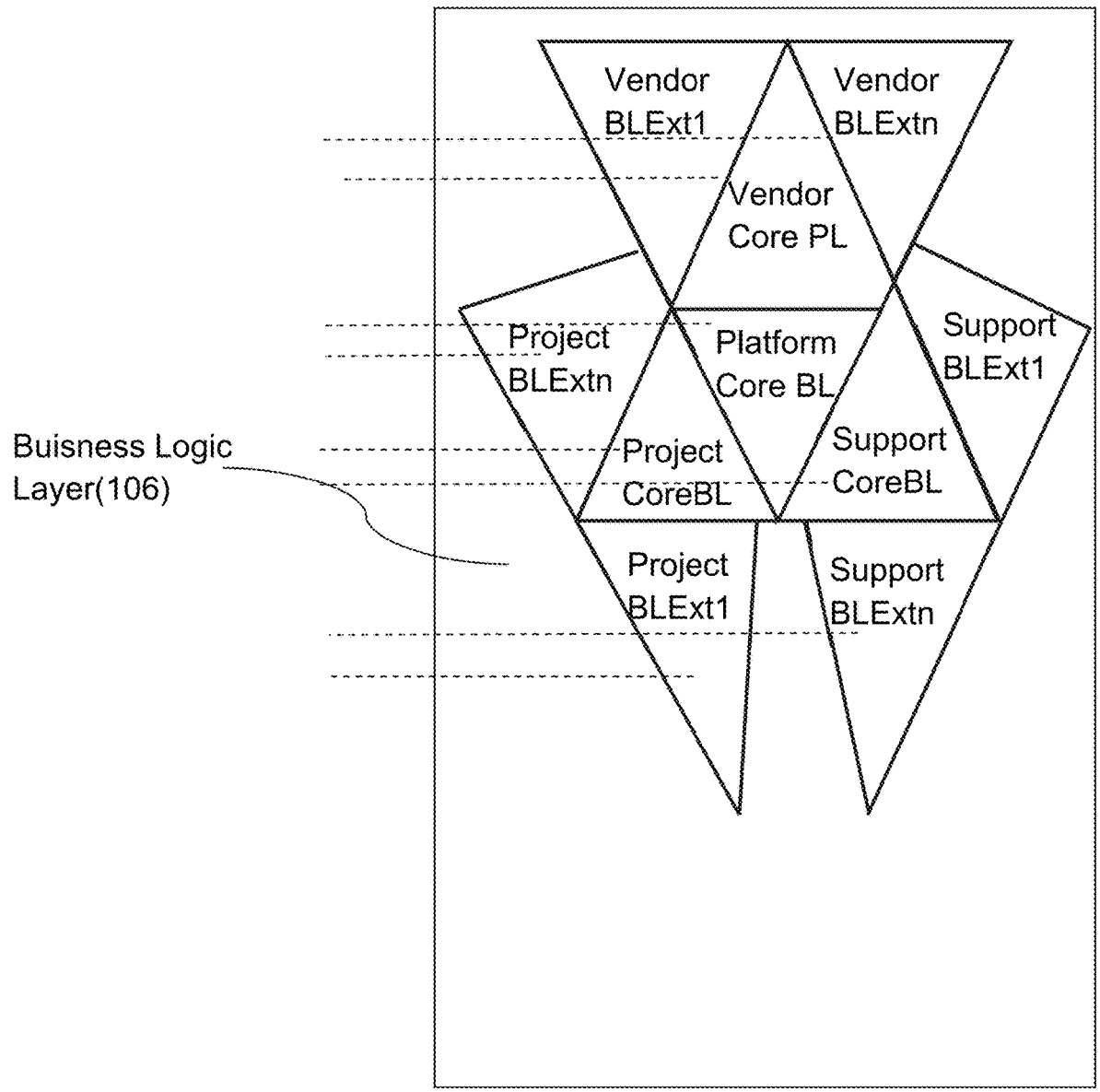
FIG. 3 represents a detailed view of a Business Logic Layer for an exemplary embodiment which provides applications for project management, IT support management and vendor management.

FIG. 3 represents a detailed view of the Business Logic Layer 106 for an exemplary embodiment which provides applications for project management, IT support management and vendor management. Each of the services in the presentation layer is connected to their corresponding business logic in the Business Logic Layer 106. This layer carries out all data validation, business logic execution and scope definition for all the required functionalities of a service. The services in the Business Logic Layer 106 are organized into core and service extensions in the same way as in Presentation layer 104. The services in the Business Logic Layer 106 are triggered either by user inputs in the presentation layer 104 or by other services in the Business Logic Layer 106. Each of the services in the Business Logic Layer 106 represent one or more point solutions which are loosely coupled so as to enable swapping of any of the solution within the platform 100 with any other best-in-breed point solution that mandated by the customer organization.

Figure 4:
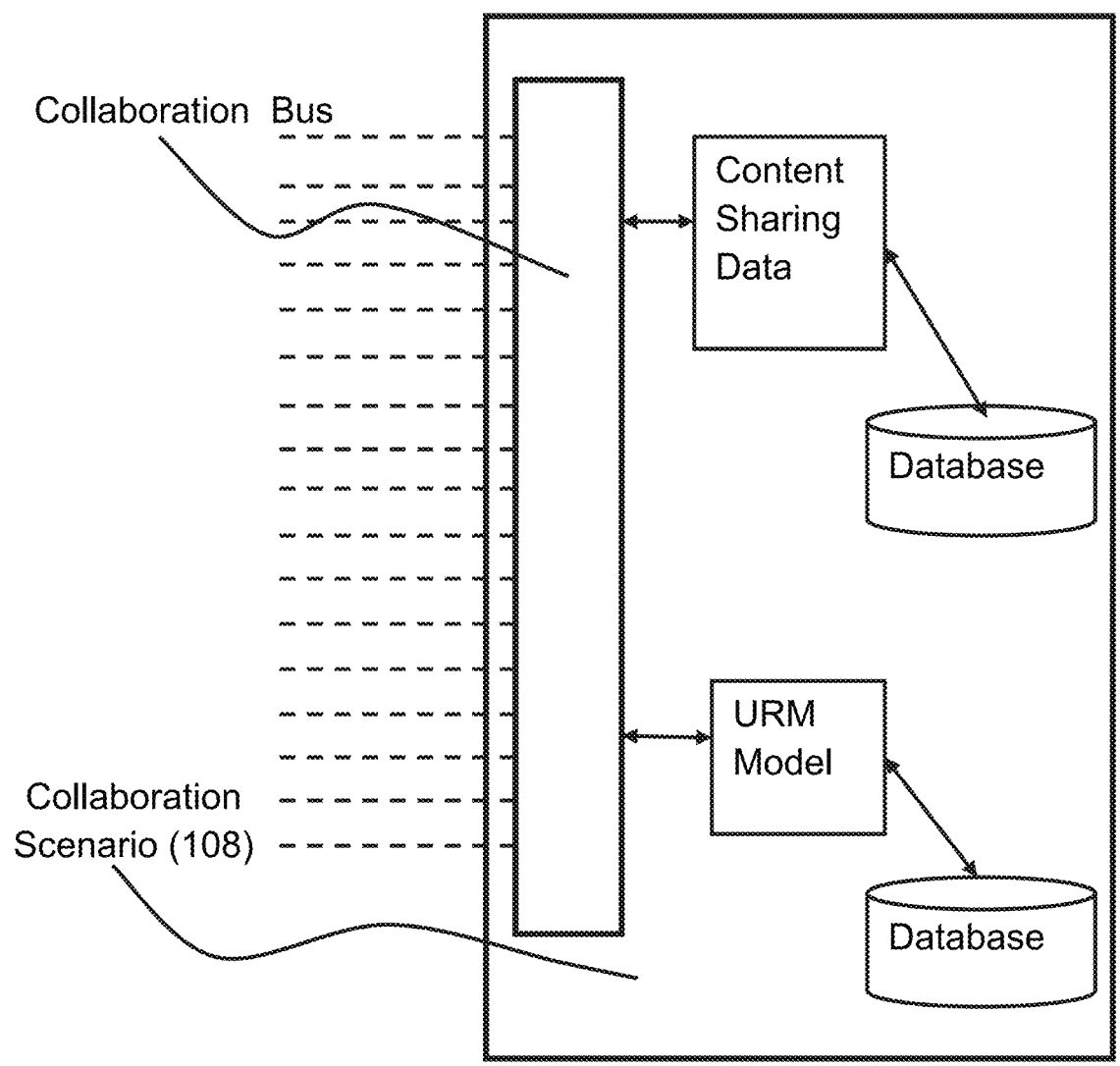
FIG. 4 represents a detailed view of collaboration scenarios module of the platform according to one exemplary embodiment of the invention.

FIG. 4 represents a detailed view of collaboration scenarios module 110. The Collaboration Scenarios module 108 contains logic for Content Management and User Role Management. The Content Management gives the various use case scenarios of how different services communicate with each other. These services may belong to one application or can even belong to a different application. The use case scenarios can be configured at a user role level or at the organizational level. The use case scenario can be even configured at service level wherein a certain set of services communicate with each other across roles and organizations.

For example, to resolve a problem ticket in workflow manager, a user can invite specific stakeholders (tagged to the ticket, or any associated assets—say, an application) for a meeting through the platform, discuss the same over the platform 100 (relevant discussions being retained as an audit trail of the meeting), and resolution given through the workflow. On resolution, an alert can be sent to authorize personnel for inclusion of relevant resolution details in the KADB/content manager which would contribute to knowledge management and reusability.

The content management also includes Web 2.0 collaboration capabilities facilitating a better traceability mechanism, collaborative content creation and document workflows, seamless content management and collaboration integration, etc. It provides a platform 100 to drive innovation—collaboration in terms of soliciting ideas (either or not tagged to specific assets or processes) from the multi-stakeholder environment, identify and seamlessly implement relevant ideas as transformation initiatives or re-engineering projects, resulting in considerable IT cost savings.

The other module in Collaboration Scenarios 108 is User Role Management which manages the users, organizations and roles which are present in these organizations. It allows for authentication and authorization of users by maintaining the authentication parameters and mapping of users to roles. The unit also maintains the data and service access privileges of roles and tags them to organizations. This also allows for delegation of roles by users. The technologies used in User Role Management module is SSO and LDAP. SSO is single sign-on for both the platform 100 and the integrated point solutions, hence enabling a user experience with respect to seamless access to all components within the platform 100. This is realized through the CAS (Central Authentication Service) standard mechanism which validates user sign-in with the backend LDAP. Both modules in Collaboration Scenarios are configurable by users with the required privileges.

Figure 5:
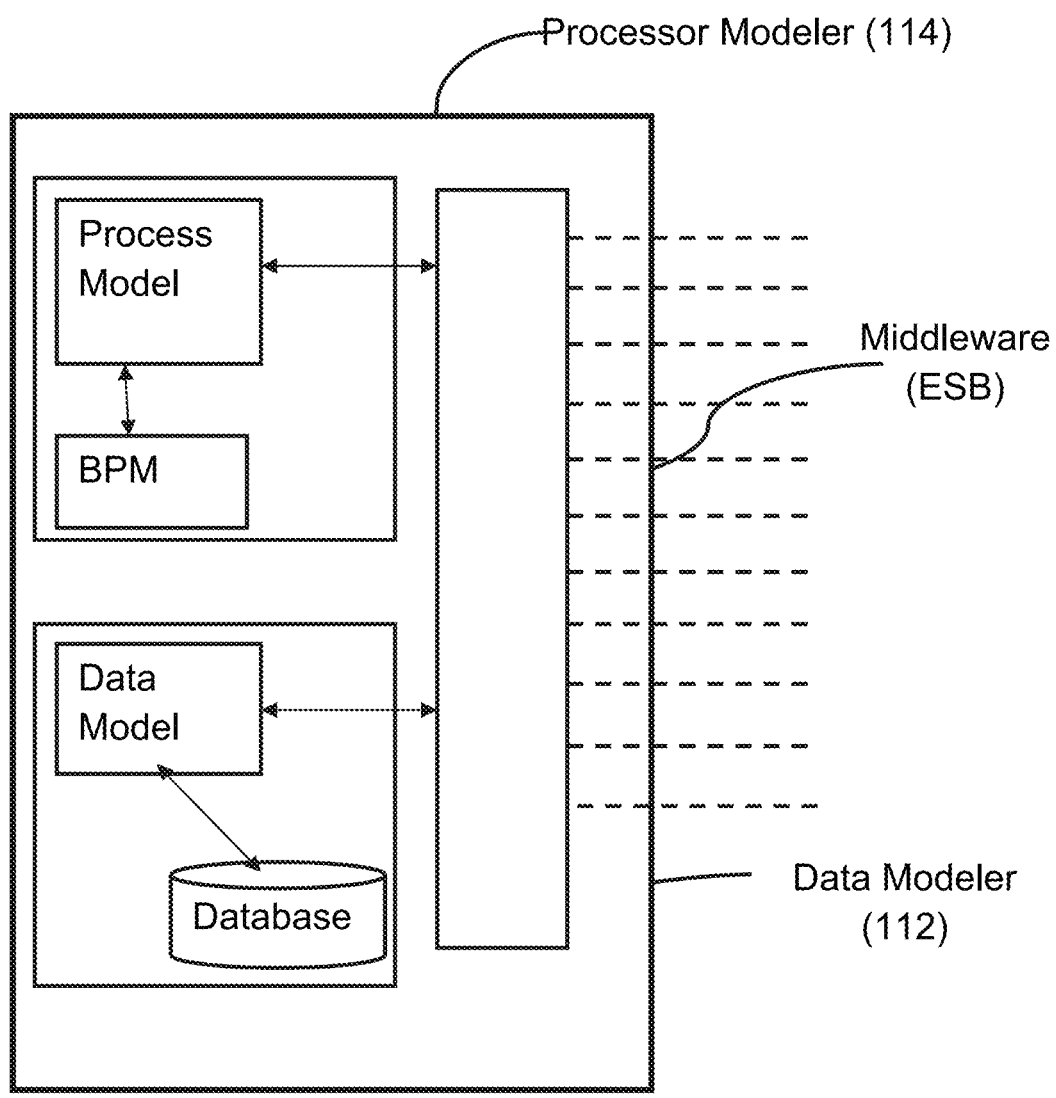
FIG. 5 represents a detailed view of a Data and Process Models module of the platform according to one exemplary embodiment of the invention.

FIG. 5 represents a detailed view of the modules for Data and Process Modeler. This module contains modules for Data Modeler 112 and Process Modeler 114. The Data Modeler module 112 is invoked by services in Business Logic Layer 106 to determine the structure of data which the service wants to access or store data to the database. The Business Logic Layer 106 is enabled by the Data Models from the Data Modeler module 112 which are used to capture business requirements. The technology involved with data modeler module 112 includes AndroMDA and ERGO UML.

The Process Modeler module 114 is invoked by the services from Business Logic Layer 106 to establish connectivity or flow amongst data models involved in that workflow and the roles involved. The Process Modeler module 114 has a Business Process Modeler to configure modifies or adds or deletes workflow which is done by roles with desired privileges. The modification of workflow involves adding or deleting steps in a workflow, changing the decision happening at a workflow, modifying dependencies and changing the role associated.

Figure 6:
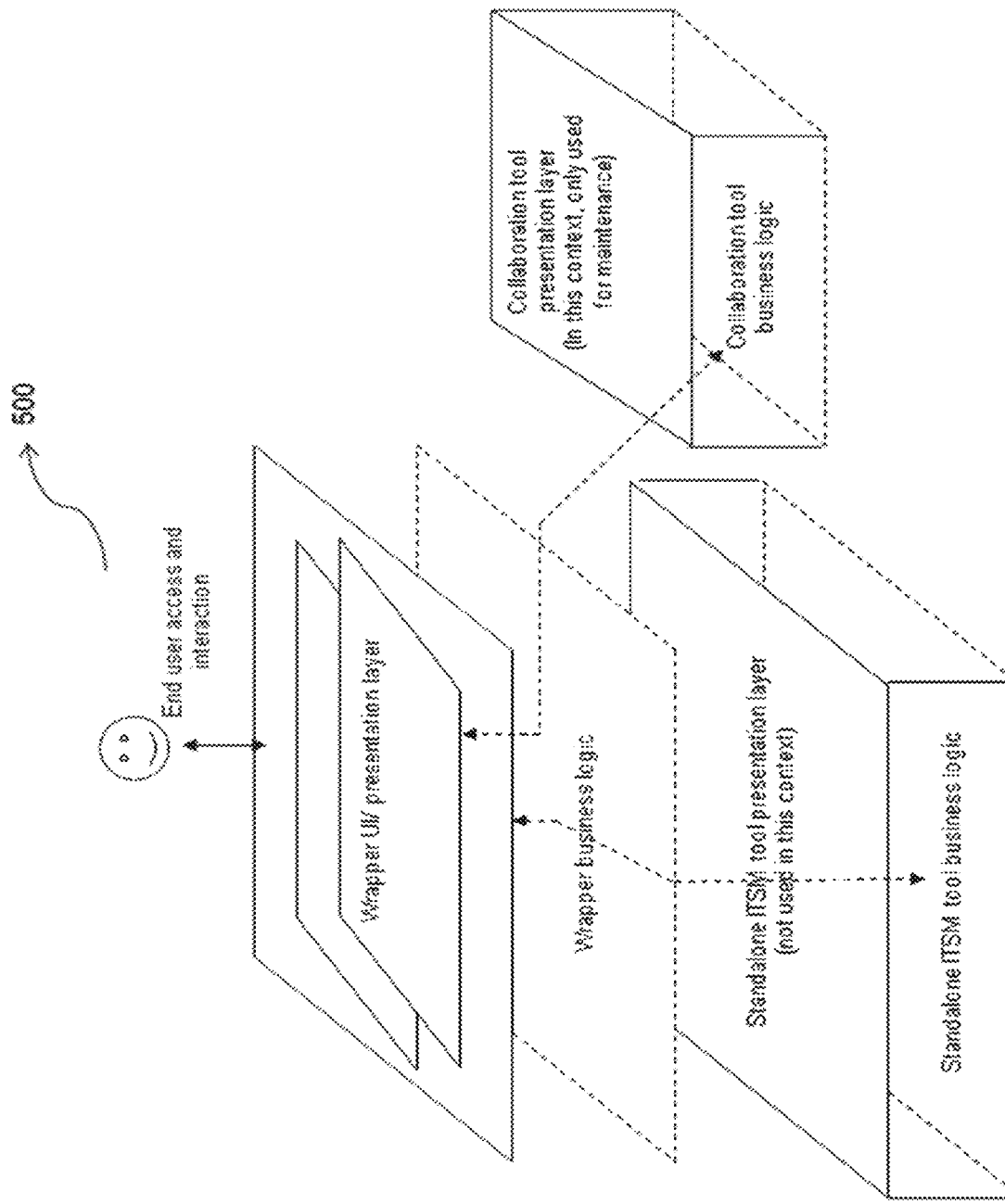
FIG. 6 shows a technical architecture of the enterprise level platform with examples of wrapper UI extensions according to one exemplary embodiment of the invention.

FIG. 6 depicts "Wrapper UI" 500 that enables easy integration of any given solution according to one exemplary embodiment of the invention. "Wrapper UI" is a concept that enables easy integration of any given solution (here, a KM or collaboration solution) with another solution (here, an ITSM solution) so that the user experience in using the former as a part of latter is seamless and unified. For example, in the above instance of 'Incident Management', context-specific KM and collaboration tools—KADB and Meeting Corner respectively—are invoked by the user through the Incident Manager tool where the user gets a unified view and experience of the two solutions acting as one.

The concept also enables extension of the above for any ITSM solution that gets integrated to the 'collaborative ITSM' platform 100 in a seamless manner, irrespective of how the standalone ITSM system would work as a separate entity. This is achieved through building and configuring an UI (to which the user will have access) along with its underlying business logic (that actually provides the interfacing with other solutions) over and above the actual UI and business logic layers of two or more separate standalone solutions.

Best Mode/Example of Working of the Invention

The invention is described in the example given below which is provided only to illustrate the invention and therefore should not be construed to limit the scope of the invention.

Figure 7:
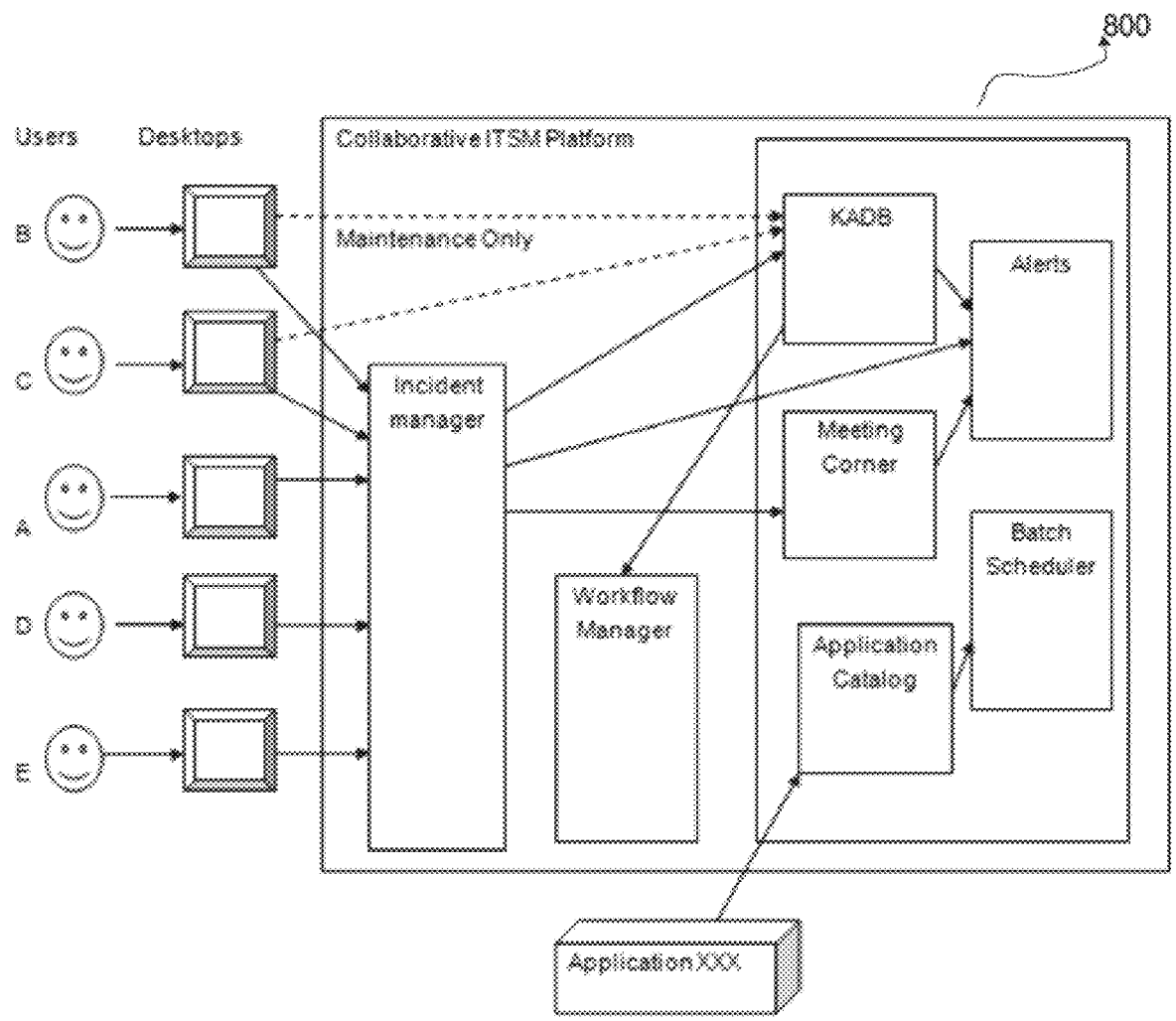
FIG. 7 shows a system for providing collaborative IT service management platform (enterprise level platform) enables to raise and resolve incident ticket according to one exemplary embodiment of the invention.

FIG. 7 shows a system 800 for providing collaborative IT service management platform (enterprise level platform 100) enables to raise and resolve incident ticket according to one exemplary embodiment of the invention. The enterprise level platform 100 comprises of platform 100 for raising and resolving incident ticket, integrated KM and collaboration systems, application Catalog (also acts as a non-content KM system) for capturing metadata related to applications including name, description, criticality, location, commissioned date, status, owner and maintenance stakeholders, etc, workflow management system, alert engine, batch schedule engine and analytics platform.

Consider a below scenario:

An online application XXX (say, catering to real-time credit card authorization in a bank) has gone down and inactive; the application needs to be up and running. There is a high impact with respect to the unavailability of the same.

Figure 8B:
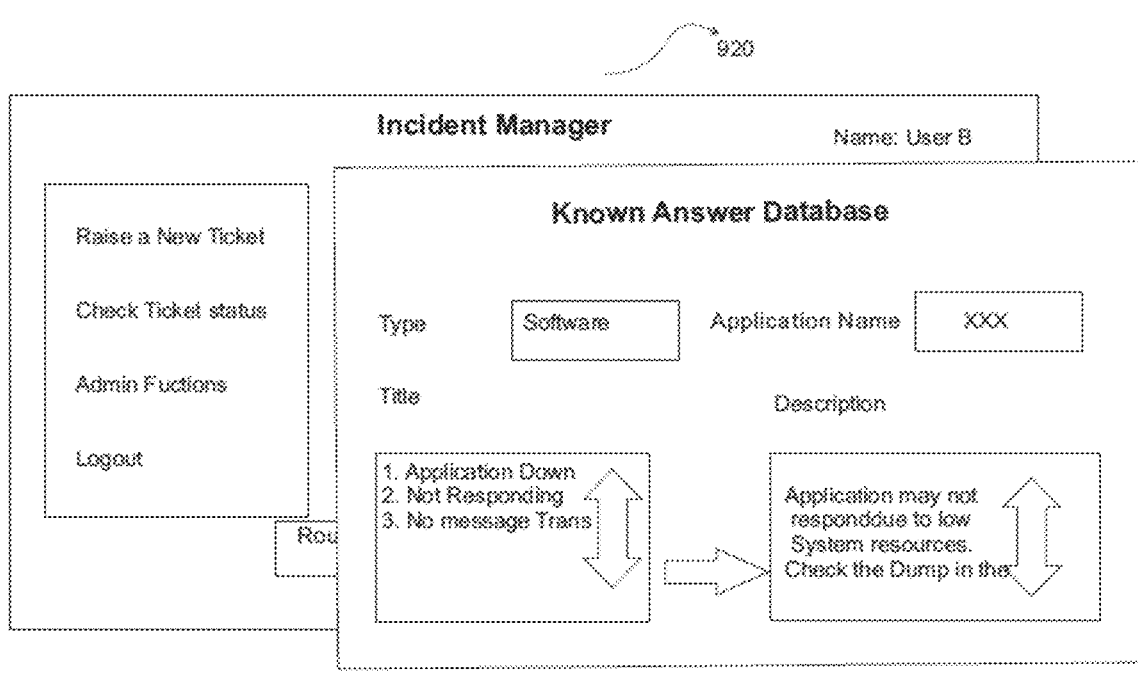
FIG. 8B shows the incident manager of the enterprise level platform enables to search the solution for the raised incident ticket by User B in Known Answer Database (KADB) according to one exemplary embodiment of the invention.

The enterprise level platform 100 enables to solve the above said issue, wherein the issue is solved by the followings steps:

1. User A raises a ticket in the incident management system as shown in the FIG. 8A. He fills up the problem type, application name, severity, description of the failure, with other fields such as incident date and incident status (open) pre-filled.
2. The ticket is routed to user B (who gets an alert) which is 'accepted' by him. User B needs to search if any similar problem has been resolved earlier. The user clicks on the 'Known Answers' button, which pulls in the relevant problem data into an integrated KADB (Known Answer Database) and shows up results for similar problem resolution, rated by relevance as shown in the FIG. 8B.
3. The user B could not find a satisfactory answer to the incident in question. Hence he invokes the meeting forum using the 'Call Meeting' button. The integrated forum automatically pulls in the application name from the incident data, pulls in the application owner and maintenance stakeholders (say owner—C, stakeholders—D, E) from Application Catalog. User B then submits the meeting entry which sends meeting alerts through the alert engine to all the stakeholders to participate with link to the incident in Incident Manager.
4. Users C, D, E joins in Meeting Corner through the same incident panel in Incident Manager, and all discussion entries that get 'entered' into the forum by participating users get retained as a discussion thread. Once all users agree upon a certain resolution approach, user B closes the meeting.
5. User B then actions on the problem, updates the incident ticket and routes back to user A for closure.
6. The incident is 'closed' by user A.
7. As the application A starts up and runs, the Application Catalog gets automatically updated with the status as 'active' through a batch schedule feed (hence, at a specified interval).
8. Data on the application status and incident gets pulled into the Analytics module for reporting and performance analysis.
9. User B opens Meeting Corner and opens up the related discussion that happened (see steps 3 and 4). He clicks on the button 'Include in KADB'. The KADB opens up with a form for new entry having details from the related incident pre-filled for modification. Also, a notification is sent to user C (application owner) with link to the new KADB entry for collaborative documentation on the incident resolution.
10. User C clicks the link in the alert and logs into the KADB system which shows up the same new entry that user B is also viewing.
11. Both users B and C modify the incident resolution text and user B clicks on 'Send for approval' button.
12. Step 11 triggers a workflow in the Workflow Management system to user F who has to approve the new KADB entry for inclusion. User F approves the same through an approval link from Workflow Management system and the new entry is included as part of KADB for future reference.

The integration of collaboration (including knowledge management—KM) and IT service management in such a manner that the ITSM drives only specific required collaboration and KM, unlike most of such systems where collaboration acts as an independent interface. This is achieved through the specific collaboration/KM User Interface present for user access as part of the ITSM component itself, rather than collaboration/KM being independently driven across users. The only time that such systems are independently accessed in the platform 100 is for knowledge base maintenance and administrative functions.

Except step 9 through 12 (which are for knowledge base maintenance), all other steps drive the fact that collaboration/KM is specifically triggered as part of the ITSM component (here, incident management system). This is extendable to all other ITSM specific components that may be integrated as part of the overall 'collaborative ITSM' platform 100.

The ITSM caters to areas as defined within the ITIL framework, and is extendable to quick integration of it and equivalent frameworks. ITSM as defined is different from any generic service management in two ways:

(a) The processes for IT service life cycles are tightly and seamlessly integrated (the actual component integration here, which is loose coupling as part of the technical platform) by well defined steps. The definition comes from the need of automation.
(b) IT service life cycles do not necessarily consider manual tasks and intervention (the initial triggers, which can be event based hence may be manual), but is more focused on automation of such tasks.

Figure 9A:
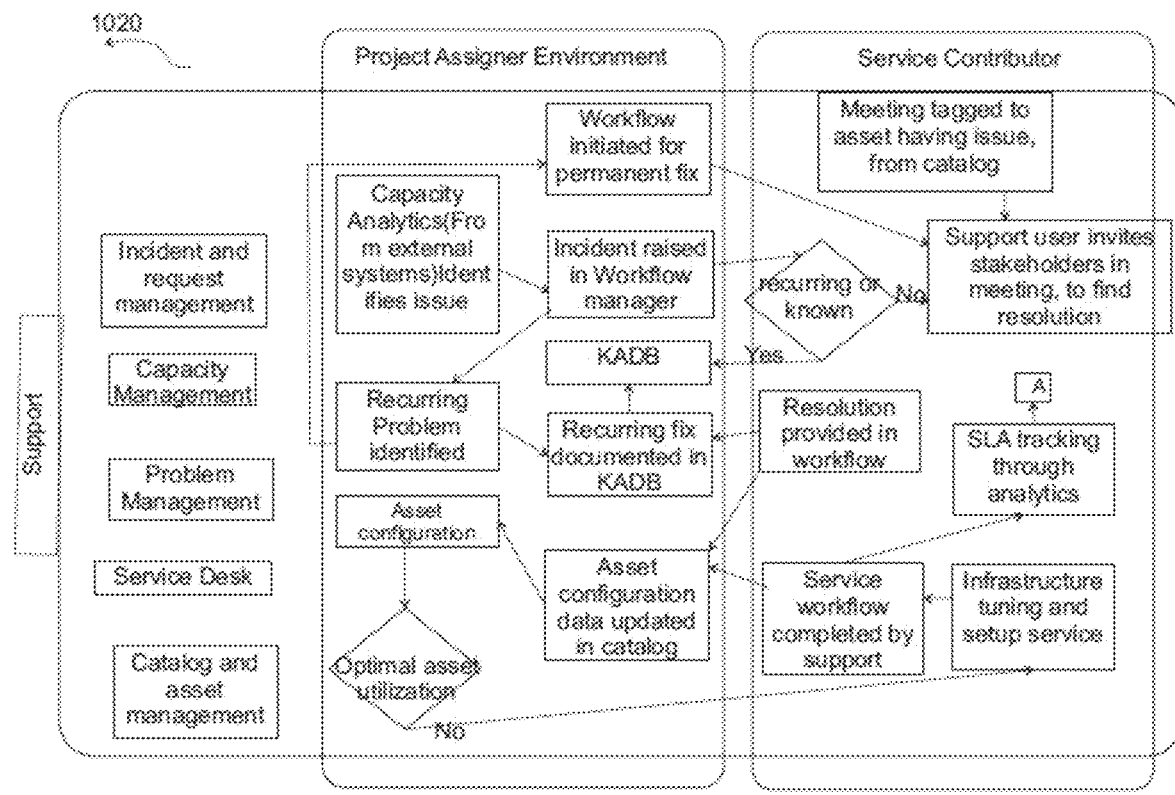
FIG. 9A is a process flow illustrates the method for providing support services in perspectives of the project assignor environment and the service contributor according to one exemplary embodiment of the invention.

FIG. 9A is a process flow 1020 illustrates the method for providing support services in perspectives of the project assignor environment 120 and the service contributor 122 according to one exemplary embodiment of the invention. If the customer 120 wants to fix any problem and the customer utilizes the collaborative platform 100 to fix such problem. The collaborative platform 100 supports to fix the interne problem, wherein the support of the platform 100 comprises of incident & request management, capacity management, problem management, service desk, and catalog and asset management. Initially, a capacity analytics is done (from external systems via collaborative platform 100 to identify the issue with asset (say, server) and then the identified incident rises in the workflow manager. The workflow manager identifies whether the problem is a recurring problem or known problem. If the identified problem is a recurring problem then it stores the same in the KADB reference. The recurring problem is identified through incident analytics and subsequently recurring fix documented in KADB and subsequently work flow initiated for permanent fix. The support user invites stakeholders in meeting, to find resolution and fix the problem permanently, wherein the meeting tagged to asset having issue, from catalog. The said resolution provided in workflow and the workflow results in the following: a) SLA tracking through analytics and is supported by sourcing and manage of the collaborative platform 100; b) recurring fix documented in KADB and subsequently stores in KADB reference database; and c) Asset configuration data updated in Catalog and it results in the Asset configuration analytics. If the optimal asset utilization is not possible then it results in infrastructure tuning and setup service workflow triggers and then the service workflow is completed by support vendor 122. The service workflow results in to the asset configuration data updated in Catalog and SLA tracking through analytics and the SLA tracking through analytics and is supported by sourcing and manage of the collaborative platform 100 which is described in the FIG. 9C.

Figure 9B:
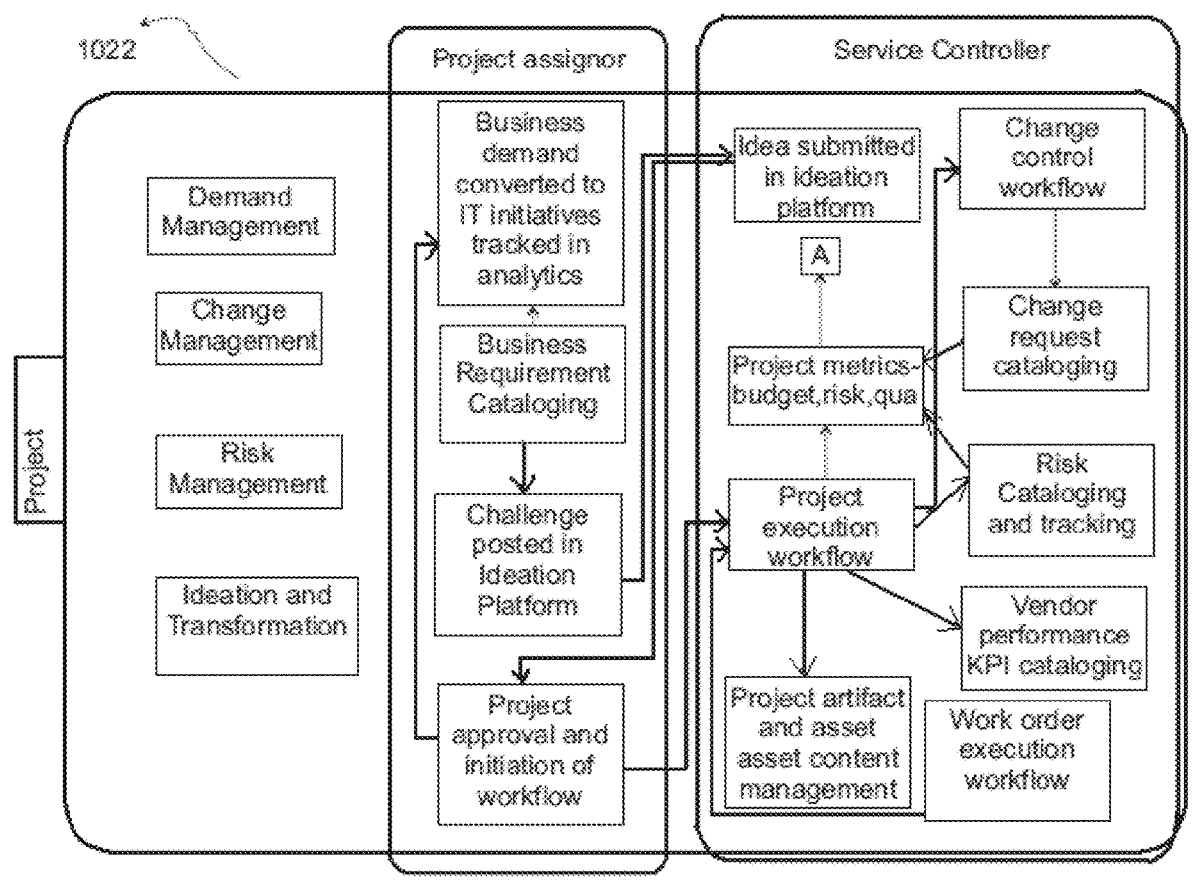
FIG. 9B is a process flow illustrates the method for project management services in perspective of the project assignor environment and the service contributor according to another exemplary embodiment of the invention.

FIG. 9B is a process flow 1022 illustrates the method for project management services in perspective of the project assignor environment 120 and the service contributor 122 according to another exemplary embodiment of the invention. The project of the collaborative platform 100 comprises of Demand Management, Change Management, Risk Management and Ideation & Transformation. Once the problem (challenge) is posted in the Ideation platform of the collaborative platform 100, the vendor stakeholder submits their ideas in the Ideation platform. The ideas are retrieved from the Ideation platform and it results in project approval and initiation work flow. Once the workflow is initiated then it results in the following: a) business demand is converted to IT initiatives tracked in analytics, wherein the business demand takes business requirement cataloging as input; b) project execution of the workflow; and c) work order execution of the workflow. The said project execution workflow results in the following: a) project metrics—Budget, Risk, Quality, & Change request and is supported by sourcing and manage of the collaborative platform 100; b) project artifact and asset content management; c) vendor performance KPI cataloging; d) risk cataloging and tracking; and e) change control of the workflow. The said change control of the workflow results in to the change request cataloging. Finally, the risk cataloging & tracking and the change control of the workflow result in to the project metrics and are supported by sourcing and manage of the collaborative platform 100 which are described in the FIG. 9C.

Figure 9C:
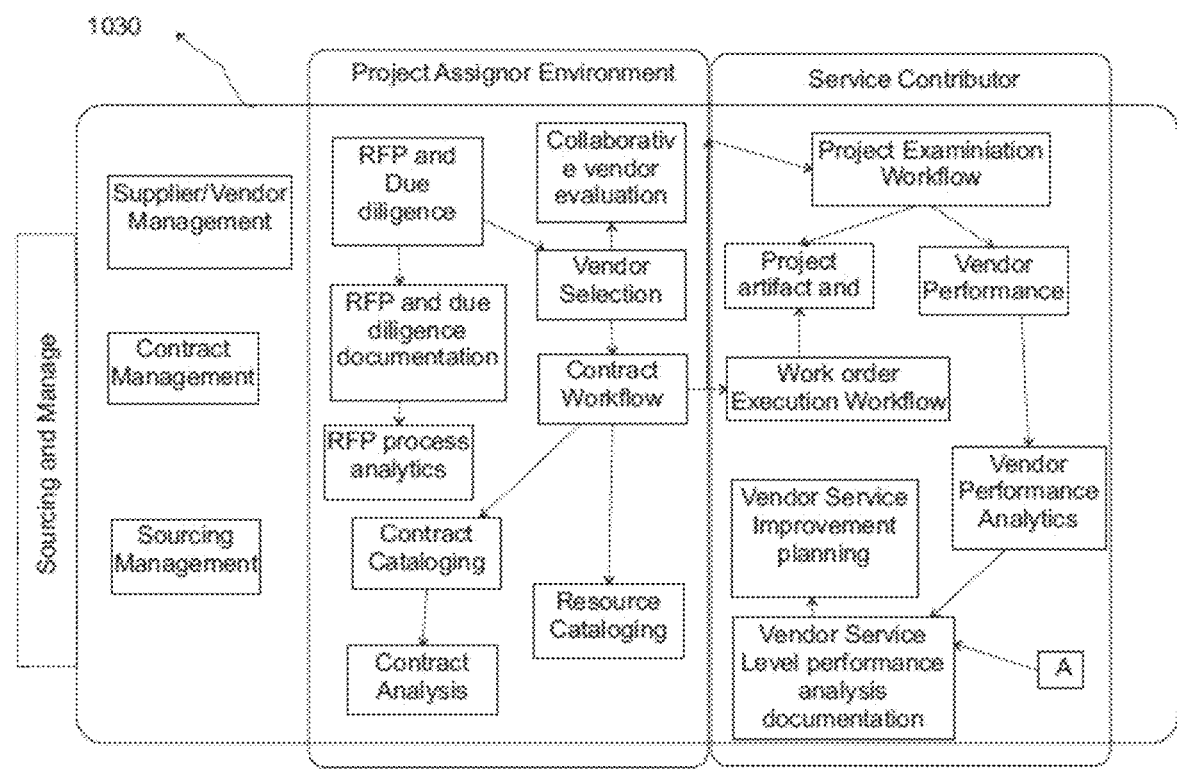
FIG. 9C is a process flow illustrates the method for providing overall governance in perspective of the project assignor environment and the service contributor according to another exemplary embodiment of the invention.

FIG. 9C is process flow 1030 illustrates the method for providing overall governance in perspective of the project assignor environment 120 and the service contributor 122 according to another exemplary embodiment of the invention. The project of the collaborative platform 100 comprises of supplier/vendor management, contract management and sourcing management. Based on the requirement of the fixing the problem at the customer end, Request for Proposal (RFP) and due diligence process workflow is initiated and it results in to the following: a) RFP and Due diligence documentation and subsequently it results in to the RFP process analytics; and b) vendor selection workflow is initiated. The said vendor selection workflow results in to the following: a) resource cataloging; b) contract cataloging and subsequently contract analytics; c) Work order execution workflow of the vendor stakeholder and subsequently project artifact and asset content management; and d) project execution workflow of the vendor stakeholder. The said project execution workflow results in to the following: a) project artifact and asset content management; and b) vendor performance KPI cataloging. The said vendor performance KPI cataloging results in to the vendor performance analytics and subsequently vendor service level performance analysis documentation is initiated. The said vendor service level performance analysis documentation takes vendor performance analytics, SLA tracking through analytics and the project metrics as an input and provides vendor service improvement planning as output.

The preceding description has been presented with reference to various embodiments of the invention. Persons skilled in the art and technology to which this invention pertains will appreciate that alterations and changes in the described structures and methods of operation can be practiced without meaningfully departing from the principle and scope of this invention.

We claim:

1. A computer implemented method for providing an enterprise level platform to enable a business service delivery and governance to a plurality of vendors, the method comprising:

providing a collaborative management platform including an electronic platform as part of a computer communication network connectable with a plurality of computers for interfacing therewith in communication with a presentation layer, a business logic layer, collaboration scenarios module, a data modeler, a process modeler, and a database layer stored in the electronic platform, wherein the electronic platform provides a single window enabling access to underlying infrastructure;

wherein the collaborative management platform provides each of the plurality of computers with a user interface for a customer or the plurality of vendors to access a plurality of business services each connected to a corresponding business logic in the business logic layer of the electronic platform, the business logic layer interactively communicates with any one of a plurality of collaboration scenarios, the data modeler, the process modeler, and the database layer through a bus and or middleware, the collaboration scenarios module includes logic for content management and for user role management which are both connected to a database in the database layer, the data modeler provides a structure of data used by the business logic layer to access the database layer, and the process modeler provides steps involved in execution of one or more of the plurality of business services, wherein each of the services in the presentation layer is connected to a corresponding business logic in the business logic layer and an application suite in the business logic layer is organized in same way as in the presentation layer in form of core services common to all applications, services common to a particular application such as project management and point services;

invoking corresponding business logic by initiating interaction with one of the collaboration scenarios module, the data modeler, the process modeler, and the database layer when the customer or vendor invokes a service in the presentation layer;

executing a logic at one of the collaboration scenarios module, the data modeler, the process modeler, and the database layer, and returning back control to the business logic layer after executing the logic;

providing, by the user interface, access to the plurality of business services for managing a plurality of applications, wherein the plurality of business services comprise the core services and service extensions, wherein the core services comprise user role management service, incident management service, search engine service, content management service, knowledge management service, collaboration service, ideation platform service, messaging service, alerts service, process engine service, and integration service, wherein the core services are used across the plurality of applications, and the presentation layer provide access to the plurality of applications including project management, Information Technology (IT) support management, and vendor management, wherein the plurality of applications interact amongst one another based on a connection between the core services, the plurality of applications being accessed through disparate service portals or a unified service portal, wherein the plurality of business services comprise a plurality of point solutions, and wherein the plurality of point solutions are loosely coupled and are swappable amongst one another based upon requirements of the customer, and wherein the plurality of applications are integrated with an Information Technology Service Management Tool (ITSM) and the collaborative management platform in a seamless manner such that ITSM drives only specific collaboration service and the knowledge management service, and wherein the core services are built with a meta-meta model to provision for at least one of configurability support, scalability and user friendly functionality of an end user;

configuring a user interface (UI) along with business logic that provides interface with ITSM solutions to get integrated to a collaborative ITSM platform;

invoking a service, by the business logic layer, in response to a query of the customer for one or more of the plurality of collaboration scenarios, wherein the content management comprises use case scenarios defining the communication between the plurality of business services including inviting one or more of the plurality of vendors and an application owner for a meeting facilitated through the electronic platform, and the user role management defines mapping of users to roles;

providing an integrated enterprise level platform to obtain governance data from multiple sources of the electronic platform;

determining, by the data modeler, in response to a query from the business logic layer, a structure of data which the plurality of business services access in the database, wherein the data modeler has one or more data models comprising model driver architecture and unified modeling language, and wherein the data is accessed by the plurality of business services during execution of the business logic to determine whether a known answer to the query of the customer exists in the database; and defining, by the process modeler using business process modeling, a workflow for the one or more data models based upon one or more of the collaboration scenarios, wherein the workflow comprises a plurality of steps to be processed for the execution of the business logic, and the execution of the business logic facilitates the management of the plurality of business services, wherein defining the workflow comprises configuring, modifying, adding, and deleting one or more steps of the plurality of steps in the workflow, and wherein a project execution workflow results in project metrics including quality and change request, project artifact and asset management, vendor key performance indicators cataloging, risk cataloging and tracking, and change request cataloging.

2. The method of claim 1, wherein the service extensions comprise demand management, change management, and risk management.

3. The method of claim 1, wherein the service extensions comprises supplier management, contract management, and sourcing management.

4. The method of claim 1, wherein the use case scenarios are configurable by a user at a user role level, an organization level, or a service level.

5. The method of claim 1, wherein the one or more of the plurality of collaboration scenarios further define access privileges of the roles to the plurality of business services.

6. A computer implemented system for providing an enterprise level platform to enable a business service delivery and governance to a plurality of modules, said system comprising:

a processor;

a memory coupled to the processor, wherein the processor is capable of executing the plurality of modules stored in the memory, and wherein the plurality of modules comprises:

a collaborative management platform including an electronic platform as part of a computer communication network connectable with a plurality of computers for interfacing therewith in communication with a presentation layer, a business logic layer, a collaboration scenarios module, a data modeler, a process modeler, and a database layer stored in the electronic platform, wherein the collaborative management platform is accessible to a plurality of users interfacing with the electronic platform;

wherein the electronic platform provides a user interface for the plurality of users to access a plurality of business services for managing a plurality of applications, each application connected to a corresponding business logic in a business logic layer of the electronic platform, the plurality of applications being accessed through disparate service portals or a unified service portal;

wherein the plurality of business services comprise core services and service extensions, wherein the core services comprise at least one of user role management service, incident management service, search engine service, content management service, knowledge management service, collaboration service, ideation platform service, messaging service, alerts service, process engine service, and integration service, wherein the core services are used across the plurality of applications, and the presentation layer provide access to the plurality of applications including project management, Information Technology (IT) support management, and vendor management, wherein an Information Technology Service Management Tool (ITSM) is integrated with the collaborative management platform in a seamless manner such that ITSM drives only specific collaboration service and the knowledge management service and wherein the core services are built with a meta-meta model to provision for at least one of configurability support, scalability and user friendly functionality of an end user, wherein each of the services in the presentation layer is connected to a corresponding business logic in the business logic layer and an application suite in the business logic layer is organized in same way as in the presentation layer in form of core services common to all applications, services common to a particular application such as project management and point services;

wherein corresponding business logic is invoked by initiating interaction with one of the collaboration scenarios module, the data modeler, the process modeler, and the database layer when the customer or vendor invokes a service in the presentation layer;

wherein a logic is executed at one of the collaboration scenarios module, the data modeler, the process modeler, and the database layer, and control to the business logic layer is returned back after executing the logic;

wherein configure a user interface (UI) along with business logic that provides interface with ITSM solutions to get integrated to a collaborative ITSM platform;

wherein a collaboration scenarios module includes logic for content management and user role management connected to a database in the database layer, and wherein a plurality of use case scenarios define communication between the plurality of business services;

wherein the data modeler in response to a query from the business logic layer provides a structure of data, wherein the data modeler has one or more data models comprising model driver architecture and unified modeling language used by the business logic layer to access the database layer, wherein the database layer is accessed by the plurality of business services during execution of the business logic to determine whether a known answer to the query of a customer exists in the database and provide an integrated enterprise level platform to obtain governance data from multiple sources of the electronic platform; and wherein the process modeler comprises business process modeling software for execution of one or more of the plurality of business services and defines a workflow for the one or more data models based upon the content management and the user role management, wherein the workflow comprises a plurality of steps to be processed for the execution of the business logic, and the execution of the business logic facilitates the management of the plurality of business services, wherein defining the workflow comprises configuring, modifying, adding, and deleting one or more steps of the plurality of steps in the workflow, and wherein a project execution workflow results in project metrics including quality and change request, project artifact and asset management, vendor key performance indicators cataloging, risk cataloging and tracking, and change request cataloging.

* * * * *